United States Patent [19]

Johansson

[11] Patent Number: 5,032,351

[45] Date of Patent: Jul. 16, 1991

[54] MODIFIED CROSS POINT SPACER APPARATUS AND CONSTRUCTION

[75] Inventor: Eric B. Johansson, San Jose, Calif.

[73] Assignee: General Electric Company, San Jose, Calif.

[21] Appl. No.: 522,022

[22] Filed: May 11, 1990

[51] Int. Cl.⁵ .............................................. G21C 3/34
[52] U.S. Cl. .................................. 376/438; 376/448; 376/434; 376/442
[58] Field of Search ................ 376/438, 448, 434, 442

[56] References Cited

U.S. PATENT DOCUMENTS

| | | | |
|---|---|---|---|
| 3,382,153 | 5/1968 | Bigge et al. | 376/438 |
| 3,600,792 | 8/1971 | Valluy | 376/438 |
| 3,966,550 | 6/1976 | Foulds et al. | 376/442 |
| 4,059,484 | 11/1977 | Bupp et al. | 376/422 |
| 4,125,435 | 11/1978 | Jabsen | 376/442 |
| 4,708,845 | 11/1987 | Mildrum et al. | 376/435 |
| 4,933,138 | 6/1990 | Mouesca et al. | 376/442 |

*Primary Examiner*—Brooks H. Hunt
*Assistant Examiner*—Meena Chelliah
*Attorney, Agent, or Firm*—R. R. Schroeder

[57] ABSTRACT

An improved spacer and method of making a spacer is disclosed for use in a nuclear fuel bundle wherein a plurality of fuel rods enclosed within a channel are maintained in parallel side-by-side relation by a plurality of the spacers. Each spacer is placed within the fuel bundle at selected elevations between upper and lower tie plates. The improved spacer is a member of the class of spacers wherein solid strips of material are welded at interstitially placed tube members between the fuel rods to form the continuous spacer grid. The improvement constitutes forming separate upper and lower reduced section grids from separate, normally aligned, first and second parallel sets of grid members. One grid is formed for the top of the spacer; the remaining grid is formed for the bottom of the spacer. Tube members placed interstitially between the fuel rods are used to interconnect the grids. The tube members themselves are in turn notched; the notches are at the upper portion of the tube members to receive the upper grid and at the lower portion of the tube members to receive the lower grid. Grids are placed within the notched tube members and fastened, typically by welding to the top and bottom of the tubes to form a unitary spacer structure. Thereafter, the excess material of the grid crossing the interior of the tube members is drilled out of the tube members to eliminate excess neutron absorbing material. There results in the disclosed spacer, two interconnected grid members extending at the top and bottom of the spacer having less material than the single and continuous grid of the prior art. At the same time, the assembly of what is otherwise a difficult member to construct is simplified. Provision is made for applying the improved spacer to spacers having differing pitch between the separated fuel rods. Additionally the incorporation of so-called swirl vanes in some grid locations is disclosed in substitution for the tube members.

11 Claims, 5 Drawing Sheets

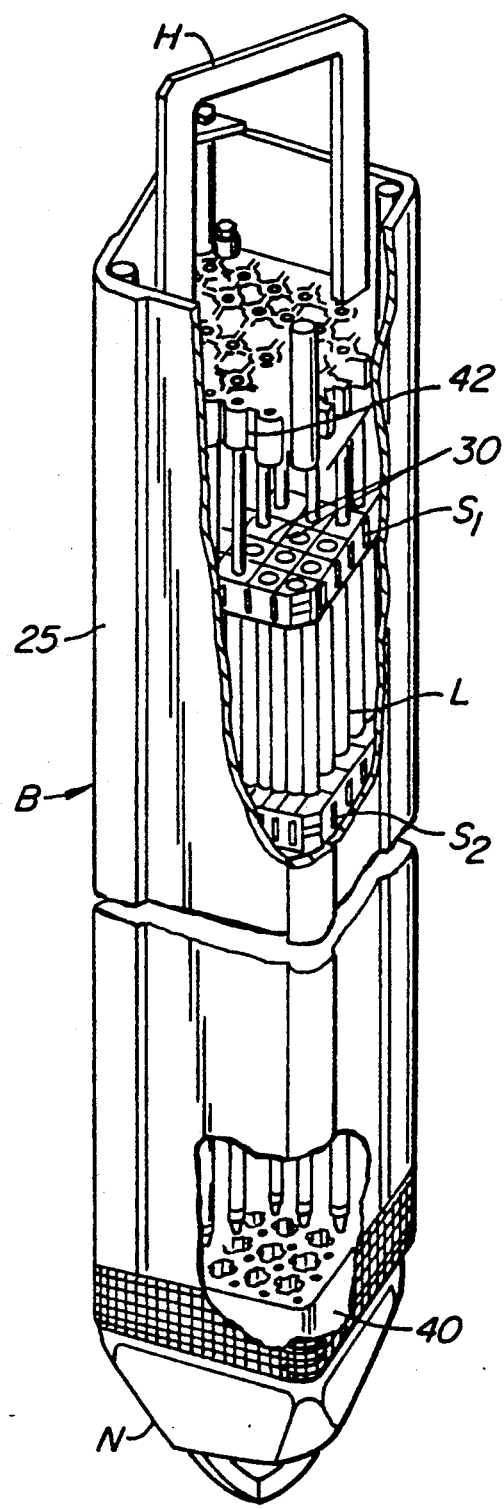
FIG._1.

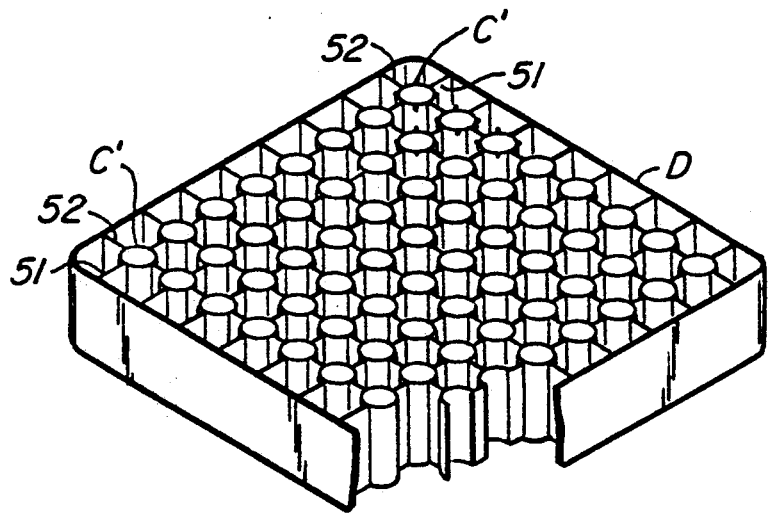
FIG._2. PRIOR ART
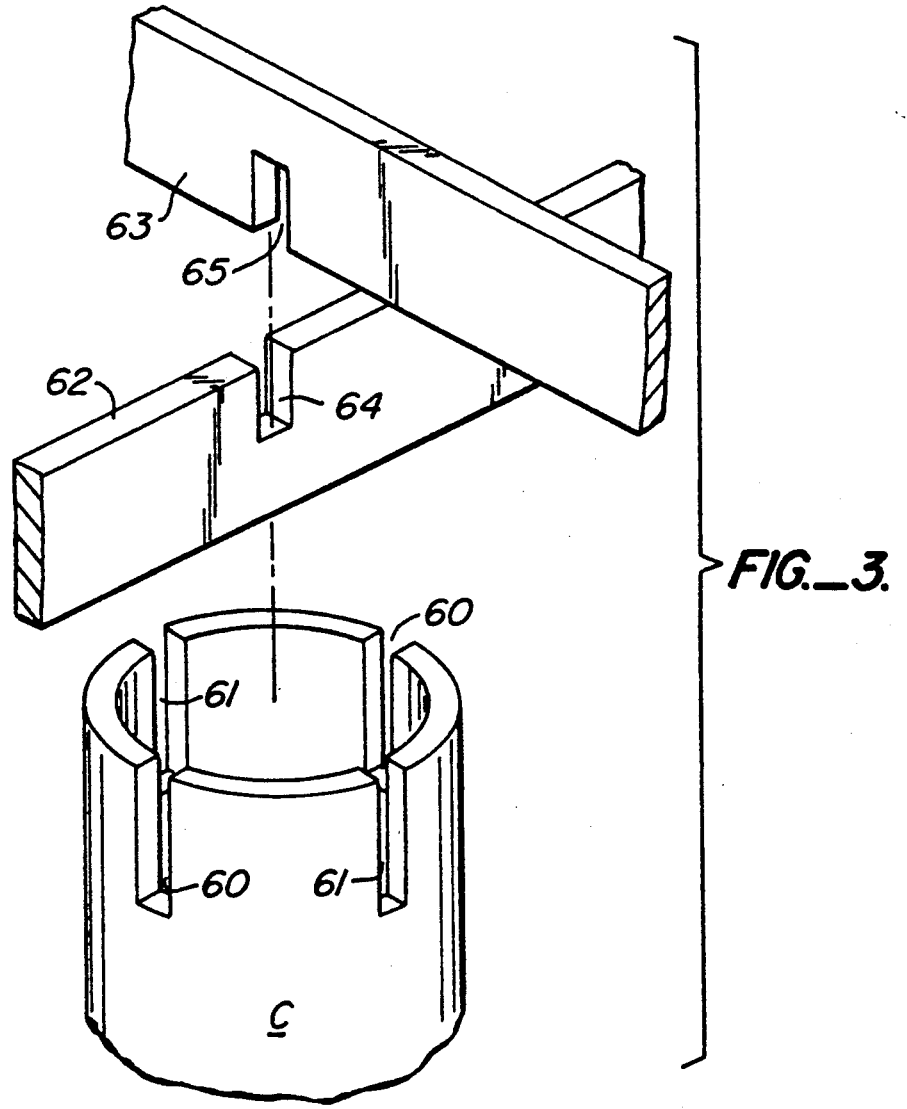
FIG._3.

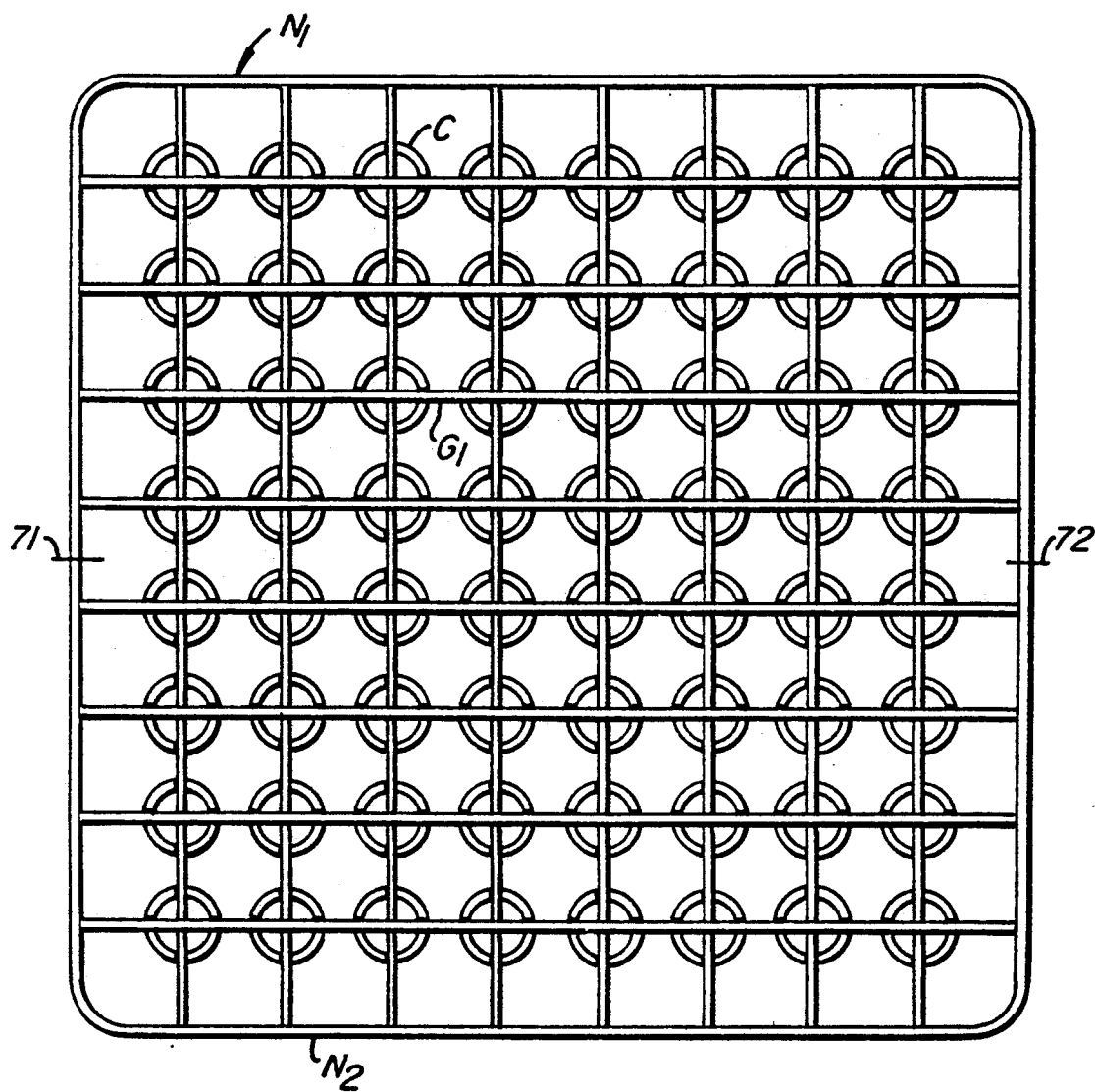
FIG._4.

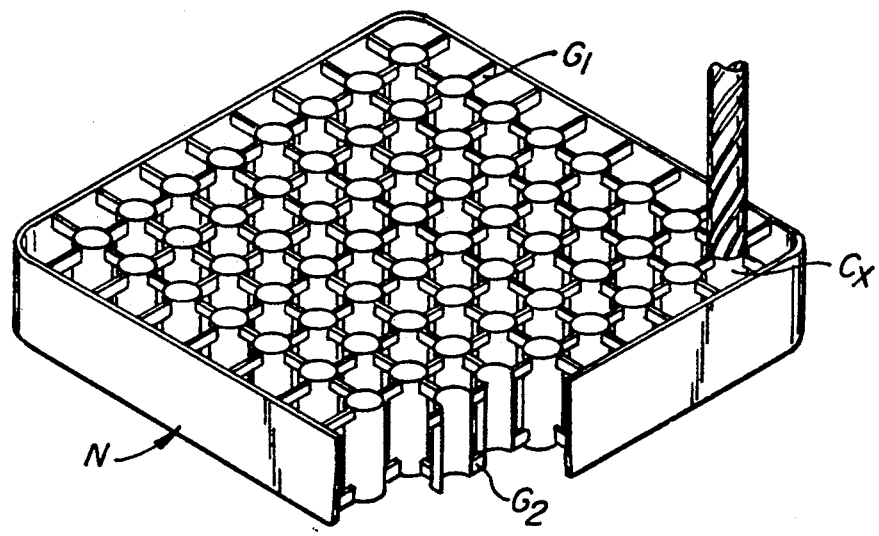
FIG._5.
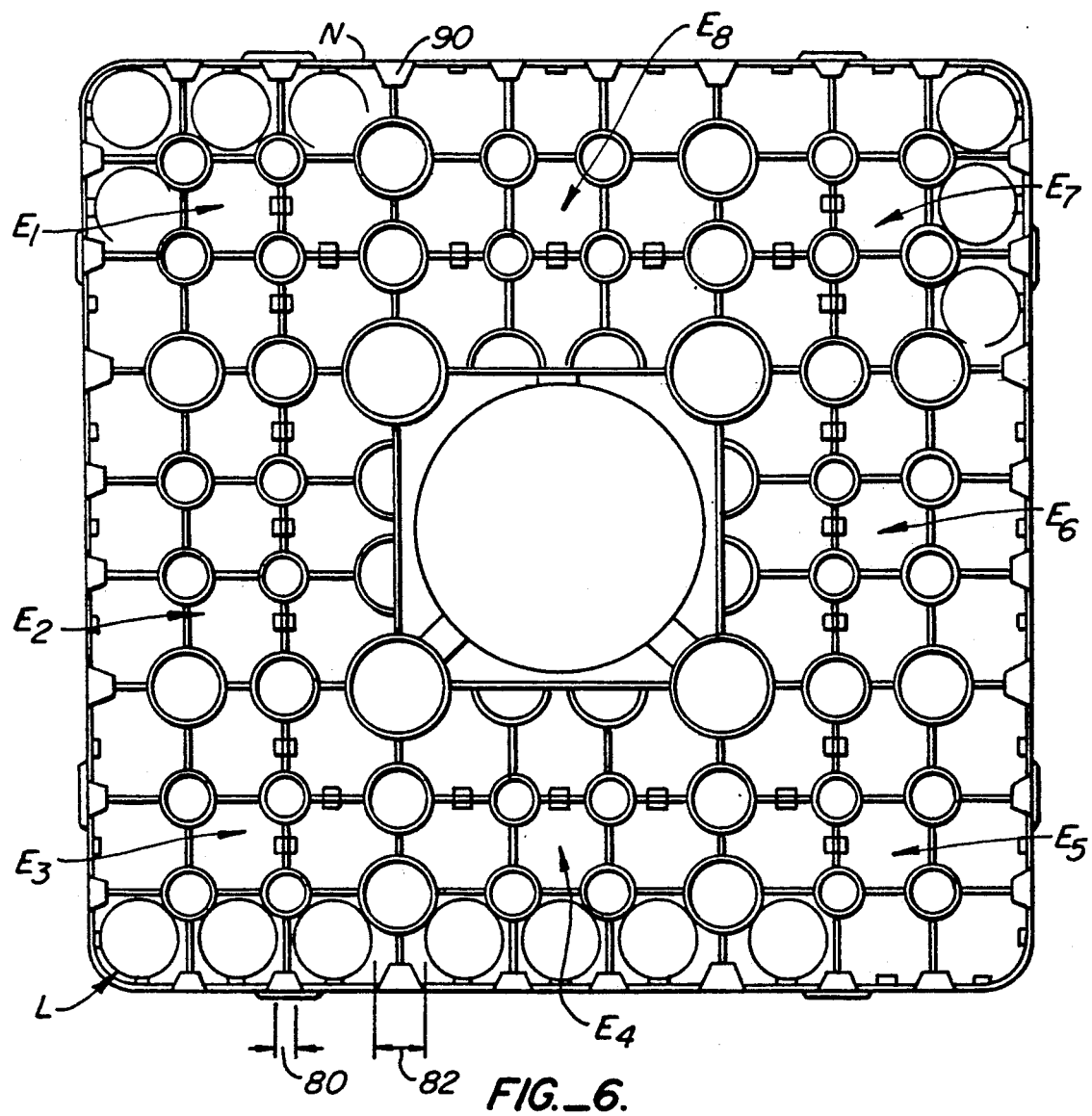
FIG._6.

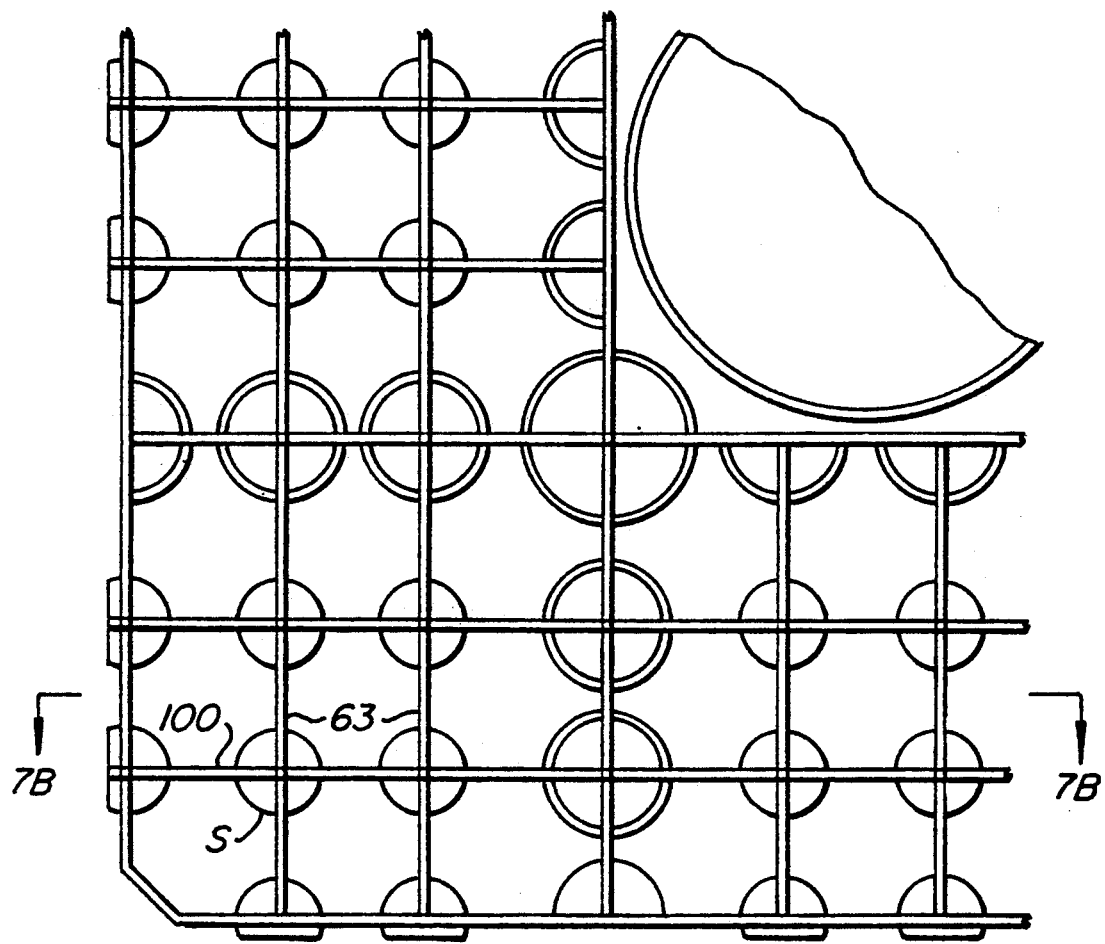
FIG._7A.
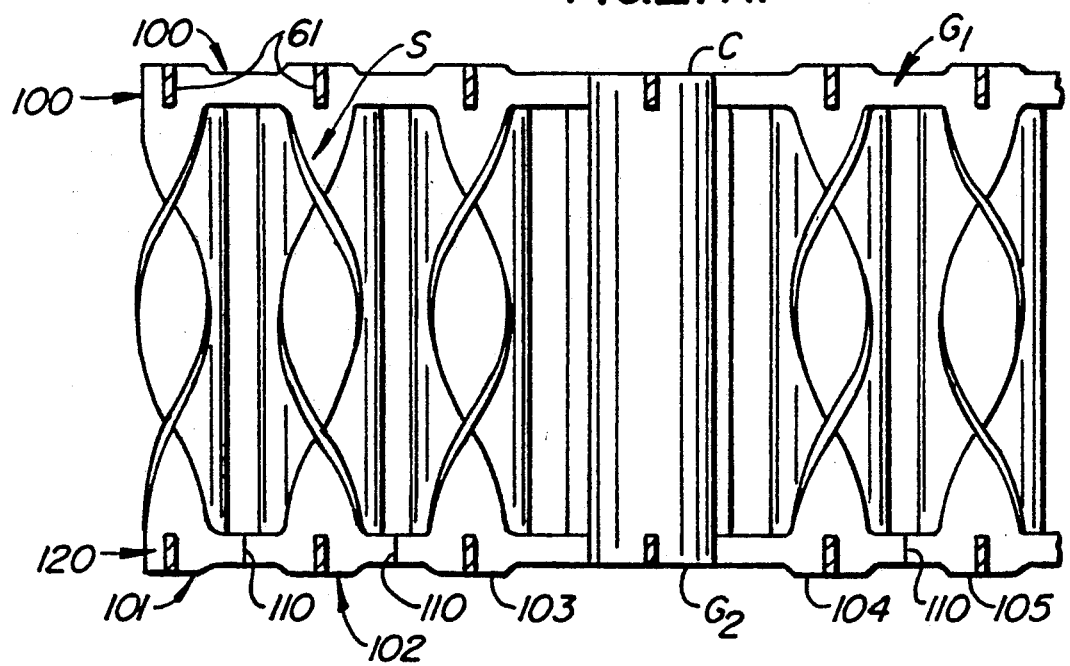
FIG._7B.

MODIFIED CROSS POINT SPACER APPARATUS AND CONSTRUCTION

BACKGROUND OF THE INVENTION

1. Field of the Invention

This invention relates to nuclear fuel bundles and more particularly to spacers used with the nuclear fuel bundles.

2. Brief Description of the Relevant Art

Nuclear reactors have fuel bundle arrays constructed of individual fuel bundles. These individual fuel bundles have a plurality of side-by-side fuel rods. The individual fuel bundles typically include a lower fuel rod supporting tie plate, an upper tie plate for maintaining the fuel rods in upstanding relation, and a fuel bundle channel for enclosing the fuel rods between the tie plates. Water flows into the fuel bundle through the lower tie plate, is confined to a flow path immediately about the fuel rods by the bundle enclosing channel, and flows out the top of the bundle in a steam water mixture.

In the assembly, transport, and operation of the fuel bundle, there is a tendency of the individual fuel rods to move from their vertical side-by-side disposition along the 160" length fuel bundle. When the fuel bundles are installed and operating within a boiling water nuclear reactor, such movement causes unwanted vibrations, interferes with the designed nuclear efficiency and is otherwise generally undesirable.

In order to prevent such movement of the fuel rods, five to eight spacers are utilized at selected elevations along the length of the fuel bundle. It is the function of such spacers to confine the fuel rods with respect to the channel as well as to maintain the designed side-by-side spacing of the fuel rods along the total length of the fuel bundle.

There have been developed over the years many kinds of spacers. While these spacers are desirable for controlling flow along the fuel rods, the spacers constitute neutron absorbing materials. This absorption of neutrons is detrimental to the nuclear economy and efficiency of the fuel within the fuel bundle. Consequently, it is always desired to maintain the least amount of neutron absorbing material in the spacers and yet have the spacers still function to perform their desired fuel rod separation function.

Spacers of the prior art have commonly been constructed of two materials. One material is the metal Inconel ®, a registered trademark of the International Nickel Company. The metal is an alloy of iron, chromium and nickel. This metal is strong, elastic and forms an ideal spring material. Unfortunately the metal has a relatively high neutron absorbing cross section.

The remaining material from which spacers are constructed is Zircaloy. Zircaloy is an alloy of zirconium with small amounts of iron, tin and other alloy metals. This metal has lower neutron absorbing cross sections but does not have the same strength of material properties and is unsuitable as a spring material. Consequently, most Zircaloy spacers have Inconel ® springs incorporated to their structure.

The present invention is an improvement to a prior art spacer sometimes known as a "cross point spacer." This spacer has the majority of its structure fabricated from Zircaloy with Inconel ® springs for the biasing of the fuel rods to the desired positions within the matrix of the spacer.

The cross point spacers are formed out of a lattice of vertically aligned tube members interconnected by strips. The tubes and strips fastened together form a continuous grid. The tube members typically form stops against which the fuel rods can be biased. This grid has individual spring members fastened to the tube interconnecting strips. The springs bias the fuel rods extending through the spacer onto tube stops formed integrally from the cylinders. The combination of the grid with its matrix of tube stops and strip fastened springs assures the uniform spacing of the fuel rods at selected elevations within a fuel bundle.

So-called cross point spacers have been proposed in a variety of configurations. In one configuration, the spatial relation or pitch between all of the fuel rods within the fuel bundle is maintained uniform. In another configuration, spacing or pitch between the individual fuel rods is varied. In either case, the improved method of spacer construction set forth herein is applicable.

It is also known to construct spacers with so-called swirl vanes incorporated to the spacers. In such construction, twisted pieces of material-twisted in the order of at least 90°, and more frequently in the order of 180° to 360°, function to partially separate water and steam passing through the spacer. Specifically, water and steam rising through the swirl vane portion of the spacer have rotating momentum imparted. Water is thrown outwardly and onto the fuel rods where the more efficient generation of steam can occur. Steam within the rising steam water mixture maintains a more central flow path. For an example of a spacer incorporating such so-called swirl vanes, attention is invited to U.S. patent application Ser. No. 323,075, filed Mar. 14, 1989 entitled Swirl Vanes Integral with Spacer Grid, now U.S. Pat. No. 4,913,875, issued 4/3/90.

SUMMARY OF THE INVENTION

An improved spacer and method of making a spacer is disclosed for use in a nuclear fuel bundle wherein a plurality of fuel rods enclosed within a channel are maintained in parallel side-by-side relation by a plurality of the spacers. Each spacer is placed within the fuel bundle at selected elevations between upper and lower tie plates. The improved spacer is a member of the class of spacers wherein solid strips of material are welded at interstitially placed tube members between the fuel rods to form the continuous spacer grid. The improvement constitutes forming separate upper and lower reduced section grids from separate, normally aligned, first and second parallel sets of grid members. One grid is formed for the top of the spacer; the remaining grid is formed for the bottom of the spacer. Tube members placed interstitially between the fuel rods are used to interconnect the grids. The tube members themselves are in turn notched; the notches are at the upper portion of the tube members to receive the upper grid and at the lower portion of the tube members to receive the lower grid. Grids are placed within the notched tube members and fastened, typically by welding to the top and bottom of the tubes to form a unitary spacer structure. Thereafter, the excess material of the grid crossing the interior of the tube members is drilled out of the tube members to eliminate excess neutron absorbing material, and to reduce the hydraulic resistance of the spacer. There results in the disclosed spacer, two interconnected grid members extending at the top and bottom of the spacer having less material than the single and continuous grid of the prior art. At the same time, the assembly of what is otherwise a difficult member to construct is simplified. Provision is made for applying the improved spacer to fuel bundles having differing pitch between the separated fuel rods. Additionally the incorporation of so-called swirl vanes in some grid locations in substitution for the tube members is disclosed.

OTHER OBJECTS, FEATURES AND ADVANTAGES

An object to this invention is to disclose a simplified technique for the fabrication of a cross point spacer for use in a nuclear fuel bundle. According to this aspect of the invention, paired upper and lower grids are constructed from normally aligned parallel arrays of confronting strips of metal. These upper and lower grids are fastened to tube members, the tube members functioning to form the point of interconnection between the upper and lower grids. Each tube member is notched at the upper and lower ends so as to receive the grids. Thereafter, the grids are fastened to the notches of the tube members. Once attachment of the upper and lower grid members has occurred, the interior of the respective tube members is drilled out and excess neutron absorbing material removed.

An advantage of the disclosed spacer construction is that less Zircaloy material is used for the spacer. The spacer is not constructed of a solid grid extending the full depth between the tube members forming the vertical interconnecting members of the spacer. Instead, the upper and lower grid members extend only partially the thickness of the spacer. In the medial region of the disclosed spacer construction, the spacer is open. As a result, less neutron absorbing material is present.

A further object to this invention is to utilize the disclosure construction to form a variable pitch spacer of the type known in the prior art. According to this aspect of the invention, the upper and lower grids are formed with varied pitch. In the preferred variation of pitch here used within a $9 \times 9$ matrix of fuel rods, eight subgroups of nine fuel rods each are clustered about a central water rod. The individual rods of the subgroup have a first relatively close spacing. The spacing between the subgroups is at a second and relatively more distant dimension. The resultant spacer thus conforms to fuel designs having variable pitch between the spaced fuel rods.

An additional object to this invention is to incorporate swirl vanes into the constructed spacer. According to this aspect of the invention, certain of the tube members are replaced with twisted strips of metal. These respective twisted strips of metal cooperate at their upper and lower portions to become integral with the disclosed grid construction.

DETAILED DESCRIPTION OF THE DRAWINGS

Other objects, features and advantages of this invention will become more apparent after referring to the following specification and attached drawings in which:

FIG. 1 is a perspective view of a nuclear fuel bundle for a boiling water nuclear reactor, this bundle utilizing spacers such as those disclosed herein;

FIG. 2 is a perspective view of a prior art "cross point" spacer, the spacer construction being broken away so that the continuous internal construction of the prior art interior grid can be seen and understood;

FIG. 3 is a perspective view of the fabrication of an upper grid with an underlying notched tube member being shown for the reception of the grid to form the interlocking structure of the upper portion of the spacer member;

FIG. 4 is a plan schematic of the disclosed grid and spacer construction before the removal of the excess material in the interior of the tube member;

FIG. 5 is a perspective of the completed spacer with excess material being removed by drilling from the interior of one of the tube members;

FIG. 6 is a view of the variable pitch cross point spacer constructed in accordance with the methods previously illustrated with respect to FIGS. 2-5, the respective grids here being constructed on an asymmetrical basis for obtaining the desired variable pitch;

FIG. 7A is a partial perspective section of the variable pitch cross point spacer of FIG. 5 with swirl vanes incorporated into the spacer structure; and, FIG. 7B is a detail of the swirl vane array for forming a portion of the spacer of FIG. 7A.

Referring to FIG. 1, a fuel bundle B is illustrated. The fuel bundles includes an upper tie plate 42, a lower tie plate 40, which lower tie plate 40 connects through a nose piece N to a boiling water nuclear reactor. In this exemplary construction, individual fuel rods L interconnect the respective tie plates through certain threaded fuel rods also known as tie rods.

A channel 25 is mounted about the group of fuel rods. Channel 25 functions to confine fluid flow from nose piece N in through the respective lower tie plate 40 and out through upper tie plate 42. During the operation of a nuclear reactor steam is generated in the fuel bundle assembly.

In the particular fuel rod here shown, certain partial length fuel rods 30 are shown. It is to be understood that the spacer design here can be utilized both with full length and partial length fuel rods.

As can be seen, the fuel bundle here shown has been broken away at the channel to expose the spacers S1 and S2. The reader will understand that approximately five to eight such spacers are used in the typical fuel rod construction. As has been made clear, the prior art contains many varieties of spacer. An improvement on the so-called "cross point" spacer is the subject of this invention. A typical prior art cross point spacer is illustrated in FIG. 2.

Referring to FIG. 2, a prior art cross point spacer construction is shown for a $9 \times 9$ fuel array. The reader will understand that fuel arrays of varying densities of rods can be covered by the spacer construction of this invention including $8 \times 8$, $9 \times 9$ and $10 \times 10$ fuel rod arrays.

Referring to the fuel rod array illustrated in FIG. 2, a series of tube members C' are shown connected by full depth first grid members 51 and second grid members 52. Grid members 51 are orthogonally aligned with respect to grid members 52. Typically fabrication is by welding the respective members 51, 52 to the outside of the respective tube members C'.

Surrounding the entire construction there is provided a band D which band D encircles the periphery of the spacer.

A portion of the spacer is broken away to illustrate the spacer construction.

It is a purpose of this invention to disclose a simplified spacer construction over the construction of FIG. 2. Moreover, a simplified method of spacer construction is set forth.

Referring to FIG. 3, a tube member C is illustrated. Tube member C includes transverse notches 60 and longitudinal notches 61. These respective notches 60, 61 have a depth for the full reception of overlying grid members.

In exploded relation overlying the tube member C, there is illustrated the construction of the grid members. A transverse member 62 is illustrated with an upwardly exposed notch 64. Similarly, a longitudinal member 63 is illustrated with a downwardly exposed notch 65.

Construction is apparent from the exploded view. Specifically, transverse member 62 is confronted to longitudinal member 63 at the confronting notches 64, 65. A grid of the desired dimension is formed such as that grid G illustrated in FIG. 4.

Two grids are formed. An upper grid G1 and a lower grid G2. These upper and lower grids fasten to the upper and lower portions of the spacer.

Tube member C is notched with respective transverse and longitudinal grooves 60, 61 at the top. Similar transverse and longitudinal grooves 60, 61 are notched at the bottom. It is into these respective notches that the identical top and bottom grids G1 and G2 are placed. At the end of such placement, a semirigid construction of tube members C and grids G1, G2 is formed as shown in FIG. 4 (only grid G1 there being shown in the partial plan view).

After assembly, welds are made at locations 5 (FIG. 4) where the grid members fit into notches in the tubes.

It will be observed that the spacer at this stage forms a semi-rigid structure. The transverse and longitudinal grid members are interlocked by fitting into the respective notches. This interlocking feature holds the grid members in the correct positions. The grids in turn interlock with the tube members and hold them in their correct position. In contrast to the prior art construction, no jig is required to position the spacer parts for welding.

Thereafter, the surrounding band segments N1, N2 are fastened as by welding to the grids, the particular band construction here shown including two band halves joined at 71, 72 typically by a butt weld.

Referring to FIG. 5, the completed spacer is illustrated in perspective. As a final step, a drill bit D is shown removing excess material from the final tube member Cx. It will be understood that all excess material has been similarly removed from similar tube members.

Viewing the completed spacer it can be seen that a unitary structure having a minimum amount of material has been constructed. Specifically, an upper grid G1 and a lower grid G2 are all interconnected by the tube members C. At the same time, the butt welded and surrounding band N forms an integral spacer structure having a minimum of parasitic neutron absorbing material.

Referring to FIG. 6, there is shown in plan view a spacer construction identical to that shown in FIG. 5. In this spacer construction a variable pitch is shown between contained fuel rods L.

Specifically, the fuel rods of FIG. 6 are arrayed in a 9×9 array. This 9×9 array includes eight groups of nine fuel rods each. The groups are designated E1 through E8.

The fuel rods in each group are separated by a first and relatively narrow distance 80. In-between the respective groups the rod separation is greater. For example, the rod separation between groups E3 and E4 is illustrated at 82. While it is not the purpose of this application to explain the theoretical nuclear efficiencies of such a fuel design, it can be seen the spacer construction technique and resulting spacer construction is capable of accommodating such a variable pitch.

Likewise, the band N can admit of modification. It will be seen that the band N includes upper flow diverting tabs 90, which tabs are known in the prior art.

Referring to FIGS. 7A and 7B, an alternate construction is illustrated. Specifically, certain of the tube members C have been replaced by so-called swirl vanes S. Specifically, swirl vanes S include a continuous upper grid member 100. Continuous upper grid member forms an integral part of grid G1.

The respective swirl vane members S all depend at sections 101, 102, 103 on one side of tube member C and at members 104, 105, etc. on the opposite side of cylinder C. These respective members are separated from one another by gaps 110.

The swirl vane members 101–105 are each twisted 360° with respect to the upper and continuous grid member 100. Thereafter the respective members 101, 102, 103 are formed into a unitary and linear bottom grid member 120. This unitary grid member is appropriately notched at orthogonal notches 61 so that the resultant continuous grid member 120 mates with the lower grid G2. It can thus be seen that the disclosed swirl vane construction integrally participates in the formation of the upper and lower grids G1, G2. From the enclosed description it will be understood that this construction technique and spacer embodiment will admit of numerous modifications, such as twist angles of 270°, 180° and 90°.

What is claimed is:

1. A method of constructing a spacer for maintaining a matrix of vertically aligned fuel rods within a fuel bundle in side-by-side upstanding spatial relation, the spacer being of the class having vertical tubular members interconnected by a grid, said method comprising the steps of:
    providing upper and lower grid members, said grid members each comprising strips of metal having major surfaces vertically aligned parallel to the vertical direction of said fuel rods within said fuel bundle, said grid members forming a matrix of crossed members defining interstitial areas for receiving and bracing individual fuel rods passing through said spacer;
    providing a matrix of tubes, said matrix of tubes being aligned vertically with respect to said fuel rods within said fuel bundle and dispose for placement to interstitial locations between said fuel rods;
    notching said tubes at said upper and lower ends for receiving said grids;
    confronting said grids to said matrix of tubes at said upper and lower notches on said tubes;
    fastening said grids to said tubes for forming a unitary grid structure for said spacer.

2. The process of claim 1 and including the step of:
    drilling said tubes after said fastening step to remove excess grid material from the interior of said tubes.

3. The process of claim 1 and wherein the matrix of said grids is uniform.

4. The process of claim 1 and wherein the matrix of said grids is of variable pitch.

5. The process of claim 4 and wherein said provided matrix of tube members includes tube members of varying diameters.

6. The process of claim 1 and wherein said step of providing said upper and lower grid members comprises the steps of:

providing for each said grid member a first set of parallel aligned grid members, said grid members having major surfaces aligned parallel to said fuel rods and spaced for passage to an interstitial passage between columns of said fuel rods;

providing for each said member a second set of parallel aligned grid members, said grid members having major surfaces aligned parallel to said fuel rods and spaced for passage to an interstitial passage between rows of said fuel rods;

notching at least one set of said grid members for engagement to the remaining set of said grid members when said first and second sets of grid members are confronted; and, confronting said first and second sets of grid members to fabricate said upper and lower grids.

7. The process of claim 1 and including the step of:

providing swirl vanes, said provided swirl vanes including upper and lower members for confrontation to said provided upper and lower grids;

inserting said swirl vanes between said provided upper and lower grids; and, fastening said swirl vanes to said grids at said upper and lower members for disposing said swirl vanes generally parallel to said fuel rods in said fuel bundles.

8. A spacer for maintaining a matrix of fuel rods within a fuel bundle in side-by-side upstanding spatial relation, this spacer comprising: upper and lower grid members, said grid members each comprising strips of metal having major surfaces vertically aligned parallel to the vertical direction of said matrix of fuel rods within said fuel bundle, said upper and lower grid members forming a matrix of crossed members defining interstitial areas for receiving and bracing individual fuel rods passing through said spacer;

a matrix of tube members, said matrix of tube members being aligned vertically with respect to said fuel rods within said fuel bundle and disposed for placement at interstitial locations between said fuel rods;

said tube members defining at said upper and lower notches;

said grids placed within said notches at said tube members and fastened thereto, said tube members interiorly thereof having an absence of grid structure whereby said spacer includes upper and lower grids with an absence of grid material therebetween.

9. The invention of claim 8 and wherein the matrix of said grids is uniform.

10. The apparatus of claim 8 and wherein the matrix of said grids is of variable pitch.

11. The construction of claim 8 and including swirl vane members connecting said upper and lower grids.

* * * * *